United States Patent
Wiser et al.

(10) Patent No.: US 7,840,532 B2
(45) Date of Patent: Nov. 23, 2010

(54) SYSTEM AND METHOD FOR STORING LARGE MESSAGES

(75) Inventors: David Wiser, San Jose, CA (US); Sanjay Dalal, Sunnyvale, CA (US); Pascal Hoebanx, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 789 days.

(21) Appl. No.: 11/740,192

(22) Filed: Apr. 25, 2007

(65) Prior Publication Data

US 2007/0198467 A1 Aug. 23, 2007

Related U.S. Application Data

(63) Continuation of application No. 10/404,865, filed on Apr. 1, 2003, now Pat. No. 7,257,645.

(60) Provisional application No. 60/376,773, filed on May 1, 2002.

(51) Int. Cl.
*G06F 7/00* (2006.01)
(52) U.S. Cl. .................. 707/610; 707/613; 707/624
(58) Field of Classification Search .................. 707/610, 707/613, 624
See application file for complete search history.

(56) References Cited

U.S. PATENT DOCUMENTS

| 5,469,562 A | 11/1995 | Saether |
| 5,604,860 A | 2/1997 | McLaughlin et al. |
| 5,630,131 A | 5/1997 | Palevich et al. |
| 5,748,975 A | 5/1998 | Van De Vanter |
| 5,801,958 A | 9/1998 | Dangelo et al. |
| 5,835,769 A | 11/1998 | Jervis et al. |
| 5,836,014 A | 11/1998 | Faiman |

(Continued)

FOREIGN PATENT DOCUMENTS

WO WO9923558 5/1999

(Continued)

OTHER PUBLICATIONS

Coward, "Java Servlet Specification Version 2.3", 38 pages, Final Release Aug. 13, 2001.

(Continued)

*Primary Examiner*—David Y Jung
(74) *Attorney, Agent, or Firm*—Fliesler Meyer LLP

(57) ABSTRACT

A large message can be stored by separating the message into an envelope portion containing information such as headers, protocols, and addresses, and a payload portion containing items such as file attachments. The envelope portion can be stored in local storage, while the payload can be stored to a persistent store. The message can be processed incrementally, such that the entire message is never in system memory. Once the envelope portion is processed, the payload portion can be read in increments without being processed, and those increments written directly to the persistent store. Alternatively, the payload can be streamed to the persistent store. A pointer in the envelope can then be used to locate and retrieve attachments from persistent storage.

This description is not intended to be a complete description of, or limit the scope of, the invention. Other features, aspects, and objects of the invention can be obtained from a review of the specification, the figures, and the claims.

18 Claims, 2 Drawing Sheets

U.S. PATENT DOCUMENTS

| | | | |
|---|---|---|---|
| 5,862,327 A | 1/1999 | Kwang et al. |
| 5,867,822 A | 2/1999 | Sankar |
| 5,933,838 A | 8/1999 | Lomet |
| 5,944,794 A | 8/1999 | Okamoto et al. |
| 5,950,010 A | 9/1999 | Hesse et al. |
| 5,966,535 A | 10/1999 | Benedikt et al. |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,023,722 A | 2/2000 | Colyer |
| 6,028,997 A | 2/2000 | Leymann et al. |
| 6,029,000 A | 2/2000 | Woolsey et al. |
| 6,044,217 A | 3/2000 | Brealey et al. |
| 6,067,548 A | 5/2000 | Cheng |
| 6,067,623 A | 5/2000 | Blakely et al. |
| 6,070,184 A | 5/2000 | Blount et al. |
| 6,085,030 A | 7/2000 | Whitehead et al. |
| 6,092,102 A | 7/2000 | Wagner |
| 6,119,149 A | 9/2000 | Notani |
| 6,141,686 A | 10/2000 | Jackowski et al. |
| 6,141,701 A | 10/2000 | Whitney |
| 6,189,044 B1 | 2/2001 | Thompson |
| 6,212,546 B1 | 4/2001 | Starkovich et al. |
| 6,222,533 B1 | 4/2001 | Notani et al. |
| 6,226,675 B1 | 5/2001 | Meltzer et al. |
| 6,230,287 B1 | 5/2001 | Pinard et al. |
| 6,230,309 B1 | 5/2001 | Turner et al. |
| 6,237,135 B1 | 5/2001 | Timbol |
| 6,243,737 B1 | 6/2001 | Flanagan et al. |
| 6,282,711 B1 | 8/2001 | Halpern et al. |
| 6,292,932 B1 | 9/2001 | Baisley et al. |
| 6,311,327 B1 | 10/2001 | O'Brien et al. |
| 6,324,681 B1 | 11/2001 | Sebesta et al. |
| 6,330,569 B1 | 12/2001 | Baisley et al. |
| 6,334,114 B1 | 12/2001 | Jacobs et al. |
| 6,336,122 B1 | 1/2002 | Lee et al. |
| 6,343,265 B1 | 1/2002 | Glebov et al. |
| 6,345,283 B1 | 2/2002 | Anderson |
| 6,348,970 B1 | 2/2002 | Marx |
| 6,349,408 B1 | 2/2002 | Smith |
| 6,353,923 B1 | 3/2002 | Bogle et al. |
| 6,360,221 B1 | 3/2002 | Gough |
| 6,360,358 B1 | 3/2002 | Elsbree et al. |
| 6,377,939 B1 | 4/2002 | Young |
| 6,393,605 B1 | 5/2002 | Loomans |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,463,503 B1 | 10/2002 | Jones et al. |
| 6,470,364 B1 | 10/2002 | Prinzing |
| 6,516,322 B1 | 2/2003 | Meredith |
| 6,549,949 B1 | 4/2003 | Bowman-Amuah |
| 6,560,769 B1 | 5/2003 | Moore et al. |
| 6,567,738 B2 | 5/2003 | Gopp et al. |
| 6,584,454 B1 | 6/2003 | Hummel et al. |
| 6,594,693 B1 | 7/2003 | Borwankar |
| 6,594,700 B1 | 7/2003 | Graham et al. |
| 6,601,113 B1 | 7/2003 | Koistinen et al. |
| 6,609,115 B1 | 8/2003 | Mehring et al. |
| 6,615,258 B1 | 9/2003 | Barry et al. |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,799,718 B2 | 10/2004 | Chan et al. |
| 6,804,686 B1 | 10/2004 | Stone et al. |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,950,872 B2 | 9/2005 | Todd, II |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,043,722 B2 | 5/2006 | Bau, III |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,076,772 B2 | 7/2006 | Zatloukal |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,184,967 B1 | 2/2007 | Mital et al. |
| 7,240,331 B2 | 7/2007 | Vion-Dury et al. |
| 2001/0016880 A1 | 8/2001 | Cai et al. |
| 2001/0032263 A1 | 10/2001 | Gopal et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Marcready et al. |
| 2002/0035604 A1 | 3/2002 | Cohen et al. |
| 2002/0073080 A1 | 6/2002 | Lipkin |
| 2002/0073236 A1 | 6/2002 | Helgeson et al. |
| 2002/0073396 A1 | 6/2002 | Crupi et al. |
| 2002/0083075 A1 | 6/2002 | Brummel et al. |
| 2002/0111922 A1 | 8/2002 | Young et al. |
| 2002/0120685 A1 | 8/2002 | Srivastava et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 | 12/2002 | Chong et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1 | 1/2003 | Amirisetty et al. |
| 2003/0028579 A1 | 2/2003 | Kulkarni et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051066 A1 | 3/2003 | Pace et al. |

| | | | |
|---|---|---|---|
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0074467 A1 | 4/2003 | Oblak et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2003/0204559 A1 | 10/2003 | Nguyen | |
| 2003/0233631 A1 | 12/2003 | Curry et al. | |
| 2004/0019645 A1 | 1/2004 | Goodman et al. | |
| 2004/0040011 A1 | 2/2004 | Bosworth et al. | |
| 2004/0068568 A1 | 4/2004 | Griffin et al. | |
| 2004/0078373 A1 | 4/2004 | Ghoneimy et al. | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | | |
|---|---|---|---|
| WO | 01/90884 A2 | 11/2001 | |

OTHER PUBLICATIONS

Nyberg, et al., "Mastering BEA WebLogic Server: Best Practices for Building and Deploying J2EE Applications", pp. 1-38, 2001, Sun Microsystems.

JAVA™ Debug Interface, definitions, retrieved from <URL http://java.sun.com/j2se/1.42/docs/guide/jpda/jdi/overview-summary.html, Feb. 21, 2007.

Kilgore, "Multi-Language, Open-Source Modeling Using the Microsoft Architecture", Simulation Conference, 2002, Proceedings of the Winter, Dec. 8-11, 2002, vol. 1, pp. 629-633.

Paul, Laura Gibbone, "RosettaNet: Teaching Business to Work Together", Oct. 1, 1999, http://www.developer.com/xml/article.php/616641.

Chen et al., "eCo Architecture for Electronic Commerce Interoperability", Jun. 29, 1999, CommerceNet.

Erich Liebmann et al., "Adaptive Data Dissemination and Caching for Edge Service Architectures Built with the J2EE", Mar. 2004, ACM Press, 2004 ACM Symposium on Applied Computing, pp. 1717-1724.

Sosnoski, "XML and Java Technologies: Data Binding, Part 1: Code Generation Approaches—JAXB and more", IBM, pp. 1-11, 2003.

Kunisetty "Workflow Modeling and simulation Using an Extensible Object-Oriented Knowledge Base Management System" Citeseer, 1996, pp. 1-60.

Dahalin et al., "Workflow Interoperability Using Extensible Markup Language (XML)", IEEE, Jul. 2002, pp. 513-516.

Blake, Ruled-Driven Coordination Agent: "A Self-Configureable Agent Architecture for Distributed Control"; IEEE Mar. 2001, pp. 271-277.

Van Der Aalst et al., Verification of XRL: "An XML-Based Workflow Language", IEEE, Jul. 2001, pas. 427-432.

Lauer, Christopher, "Introducing Microsoft DotNet", http://web.archive.org/web/20020702162429/http://www.freevbcode.com/ShowCode.asp?ID=2171; pp. 1-10.

Moran, C. et al., "ARIES: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.

Sun Microsystems, IPlanet Application Server 6.0 White Paper, iPlanet E-Commerce Solutions, May 25, 2002, pp. 1-104.

Duvos, Enrique, et al., "An Infrastructure for the Dynamic Distribution of Web Application and Services", Department of Computer Science Boston University, Dec. 2000, pp. 1-22.

Roman, Ed, et al., "The Technical Benefits of EJB and J2EE Technologies over COM+ and Windows DNA", Enterprise Edition (J2EE) Technologies, Dec. 1999, pp. 1-24.

Mariucci, "Enterprise Application Server Development Environments", University of Stuttgart, Oct. 10, 2000, pp. 1-30.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Stylus Studio, "Xquery Mapper", 2007, 6 pages, Stylus Studios.

Altova, "XML-to-XML Mapping", 2007, 3 pages, Altova Map Force.

Jamper, "Jamper-Java XML Mapper", 2007, 4 pages, Sourceforge.

Van Der Aalst et al., "Verification of XRL: An XML-based Workflow Language", IEEE, Jul. 2001, The Sixth International Conference on Computer Supported Cooperative Work in Design, pp. 427-432.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Plaindoux, "XML transducers in Java", May 2002, The Eleventh International World Wide Conference, retrieved from: http://www2002.org/CDROM/poster/132/index.html., 6 pages.

BEA Systems, Inc., "Transforming Data Using Xquery Mapper", BEA AquaLogic Service Bus 2.0 Documentation, 2006, 19 pages.

HP, "hp application server" developer's guide, version 8.0, 1999-2001, p. 27-81, 127, 160, 195-271.

Coward, "Java Servlet Specification Version 2.3, Final Release Aug. 13, 2001 [retrieved from Internet-Google http://www.orionserver.com/docs/specifications/servlet2_3-fcs-spec.pdf" on Mar. 20, 2009], 257 pages.

Wiley, book entitled "Mastering BEA WebLogic Server: Best Practices for Building and Deploying J2EE Application", ISBN: 978-0-471-28128-3, Sep. 2003, http://www.wiley.com/WileyCDA/WileyTitle/productCd-047128128X.html, May 25, 2010, 1 page.

Nyberg et al., Excerpt from the Book "Mastering BEA WebLogic Server: Best Practices for Building and Deploying J2EE Application" Chapter 1 titled "Building Web Applications in WebLogic", pp. 1-38 [retrieved from Internet-Google "http://media.wiley.com/product_data/excerpt/8X04712812/047128128X.pdf" on Mar. 20, 2009], 38 pages.

Duvos, "An Infrastructure for the Dynamic Distribution of Web Applications and Services", Department of Computer Science Boston University, BUCS-TR-2000-027, Dec. 2000, 22 pages.

SYSTEM AND METHOD FOR STORING LARGE MESSAGES

CLAIM OF PRIORITY

This application is a continuation of U.S. patent application Ser. No. 10/404,865, filed Apr. 1, 2003, entitled "System and Method for Storing Large Messages" which claims priority to U.S. Provisional Patent Application No. 60/376,773, filed May 1, 2002, entitled "System and Method for Storing Large Messages", which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/404,552 filed Apr. 1, 2003, to Mike Blevins et al. and entitled, "COLLABORATIVE BUSINESS PLUG-IN FRAMEWORK";

U.S. patent application Ser. No. 10/404,684 filed Apr. 1, 2003, to Mike Blevins et al. and entitled, "SYSTEMS AND METHODS FOR BUSINESS PROCESS PLUG-IN DEVELOPMENT"; and U.S. patent application Ser. No. 10/404,666 filed Apr. 1, 2003, to David Wiser et al. and entitled "Single Servlets for B2B Message Routing."

FIELD OF THE INVENTION

The present invention relates to the storage of large messages in a computer system or on a computer network.

BACKGROUND

Existing integration and messaging systems have problems handling large messages. Incoming messages are read into memory in their entirety, such that when a number of large messages are received a system can crash due to a lack of available memory. Some systems try to prevent these problems by limiting the size of messages that can be processed through a system, but this approach is undesirable to users needing to send messages that may occasionally exceed that limitation.

Another existing approach utilizes in-database persistence and in-memory caching on a hub. Persistence saves enough data for recovery purposes, and caching allows messages to be serialized to a Java Message Service (JMS). This allows JMS to enqueue faster, and allows a JMS dequeue to request the message from a cache without having to redo expensive operations like deserialization, decryption, and XML parsing. The problem still exists in that it is necessary to read an entire message into memory in order to process the message.

BRIEF SUMMARY

Systems and methods in accordance with embodiments of the present invention can overcome deficiencies in existing messaging systems by changing the way in which messages are processed and stored. An integration component can receive an incoming message, such as from a Web server. The integration component can separate the message into an "envelope" portion, which can contain information such as headers, protocols, and addresses, and a "payload" portion, which can contain items such as file attachments. The integration component can write the envelope portion to local memory, and can write the payload portion to at least one persistent store. A pointer can be placed in the envelope to identify the location of the payload in the persistent store. Applications can then use the envelope to locate the payload in a persistent store.

An integration component can also process a message incrementally. The integration component can process portions of the message until the payload portion is reached. The integration component can then stop processing the message, but can continue to read the message in increments and write those increments to a persistent store. Parsers such as MIME parsers and XML parsers can be used by the integration component to process the message. Alternatively, the integration component can process the message as a stream, or at least write the payload portion to the persistent store as a stream.

Other features, aspects, and objects of the invention can be obtained from a review of the specification, the figures, and the claims.

DETAILED DESCRIPTION

In systems and methods in accordance with embodiments of the present invention, "large" messages, such as large business messages in XML format, an be processed in a Web server or integration application. These business messages can be Java Message Service (JMS) messages, for example, which can utilize distributed destinations in a cluster. A large business message can be any message that may have an attachment or a large amount of text, for example, which can have an overall message size of at or above 1 MB, at or above 10 MB, at or above 50 MB, or even at or above 100 MB. For example, company A can send a message to company B that has a file size of 100 MB. The integration system receiving that message will have to process and resend the entire message. In existing systems, it is necessary to read the entire message into memory before writing the message to disk. The read and write are each done in one complete step. Present systems also have to parse the entire message.

Figure 1:
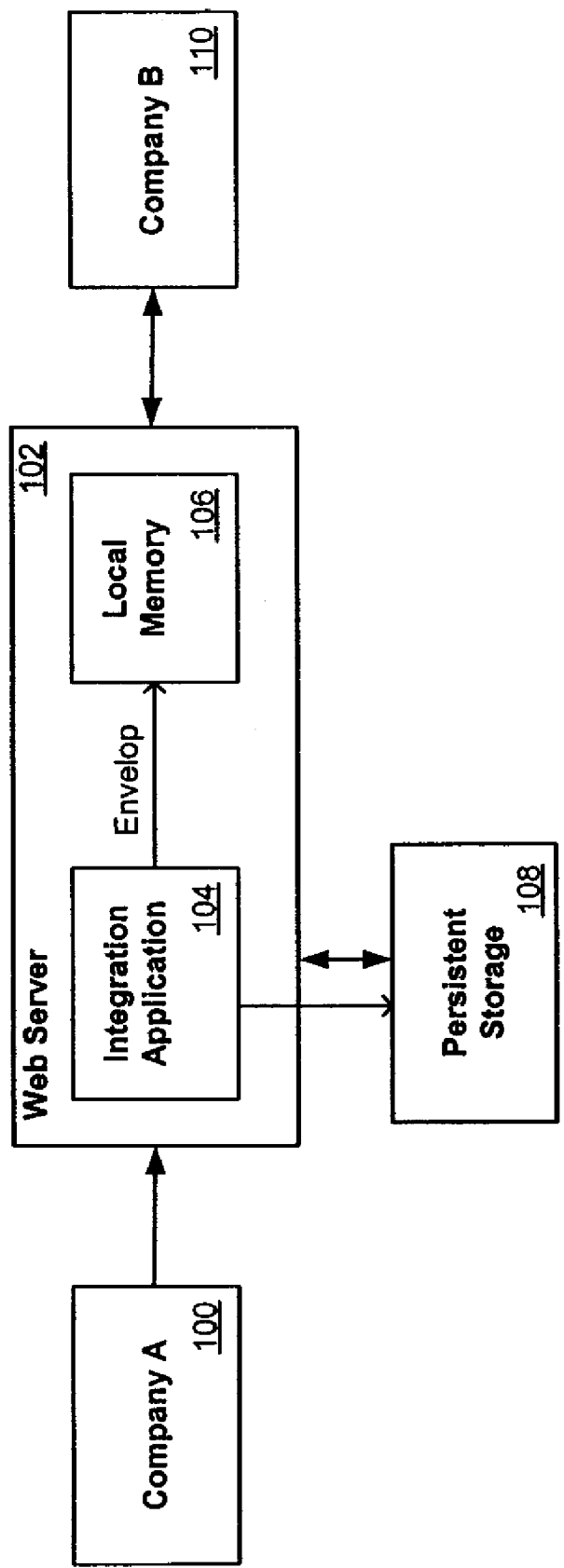
FIG. 1 is a diagram of a system in accordance with one embodiment of the present invention.

As shown in FIG. 1, when a message from a company A 100 is first received to an integration component 104 from a Web server 102, the message can be read into local memory 106. Local memory can be any appropriate storage medium, such as may be located on the Web server itself, in a cluster containing the Web server, or on a network node accessible to the Web server. If several large messages are received by the Web server 102, the server may eventually run out of memory. In a system in accordance with one embodiment of the present invention, portions of the body of each message can be stored in persistent storage 108 instead of being completely stored in local memory 106. There are at least two types of persistent storage, including file-based persistence stores and data-based persistence stores.

Continuing with the example, company B 110 can be working with an integration application. When the message arrives at the Web server 102 for company B 110, the message can arrive on a socket on the network. Portions of the message can be stored somewhat directly to the persistent message store 108 instead of being read entirely into local memory 106. One way to do this is to read the message in increments, or small portions, and write those small portions to storage. For example, the 100 MB message could have a 4 MB portion read into local memory 106, then have that 4 MB portion written to persistent storage 108. Then another 4 MB portion could be read into local memory and written to persistent storage. This process could continue until the entire body portion of the message is in persistent storage 108. Although portions of the entire message may be in memory at one point or another, there would only be up to 4 MB of the message in local memory at any given time. The user can configure the persistent store 108 so that the message is sent to a file or to a database, for example. The portion size can be any size appropriate for the size of the message or the capacity of the system, such as portions of 1 MB, 5 MB, or 10 MB. The portion size can also be a percentage of the overall file size, such as 1%, 5%, 10%, or 25%, for example.

Figure 2:
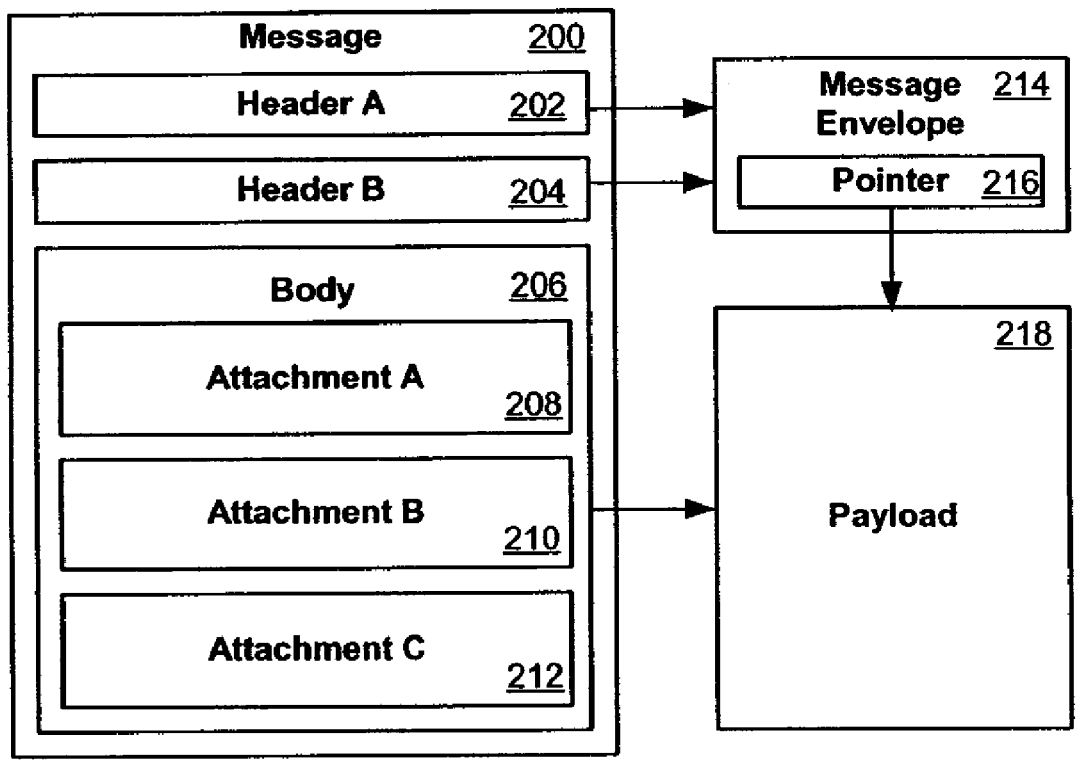
FIG. 2 is a diagram of a message that can be processed using the system of FIG. 1.

When a message is processed using an integration application or integration server, for example, the message can use a storage method referred to herein as "envelope plus payload." The message can be processed in the server to separate the contents to be placed in the "envelope" from contents to be placed in the "payload." This is shown, for example, in the diagram of FIG. 2. Headers 202, 204 of a message 200 can be extracted by an integration server, as the headers may be all the server requires to process the message 200. A header can identify the protocol under which the message is sent, such as an XOCP protocol. The protocol can be used to help identify the headers 202, 204 and the body 206 of the message. It can be important in certain systems to identify the message protocol, as protocols such as RosettaNet and ebXML have different packaging semantics than a protocol such as XOCP. The headers can be placed in the envelope 214, which can be stored in local memory. The body 206 of the message 200, which can contain several attachments 208, 210, 212, for example, can be placed into the payload 218. The payload can be stored in persistent storage on the server, in the cluster, or on the network. The envelope 214 can contain a pointer 216 to the location of the payload 218.

Since a message can contain a body with multiple parts, the payload can be designed to contain multiple parts as well. While processing a message in the server, however, only the envelope may be needed. The payload can belong to the user of a B2B server, for example, or an application riding on top of an integration server. The payload can be stored to persistent storage, so that the full payload is never stored in memory. A server or any application can simply deal with the envelope, which can contain pointers to the payload. When an application wants to access any portion of the message, the application can view information contained in the envelope, which can include identification information for the payload parts.

An application can use any pointers in an envelope to extract portions of the body of the message stored in the payload. As the application can retrieve the data from this persistence store, it is not necessary to accumulate everything in local memory on the integration server. A message envelope can contain a pointer to the body of the message, whether there is a single message body or a number of portions, or can contain a pointer for each portion of the body in persistent storage. The number of portions can include a number of attachments, for example. It is not necessary for the integration system to process the attachments to a message, so the system can simply write the attachments to storage, either all together in one block of memory or individually. The pointer can point to the location at which a portion of the message body begins in memory, or can point to the boundaries of a given body portion in memory, for example.

An envelope can contain other useful information about a message, such as the address of the sender and/or the address of the recipient. Each of these addresses can each be a URL, for example. The envelope can also contain the protocol of the message and possibly the protocol of any body portion, if applicable. The envelope can contain message text. The envelope can also contain information about each attachment in the body, such as title, file type, and historical information.

At least two levels of parsing can be used to process a message. A low-level parsing mechanism can be used to decode transfer protocols such as MIME or UUENCODE. The low-level parser can receive the byte stream and identify the parts of the message, such as a text portion and a binary attachment. A second level of parsing, such as XML parsing, can be used to read headers and body portions, which can be in XML or another appropriate messaging or mark-up language.

A message can arrive from the Internet, for example, and can pass through the Web server into an integration transport layer. First, the message can pass through a MIME parser. Second, the message can be decoded using a second processing layer to determine the appropriate business protocol. The envelope can be created in this transport layer. In the decoding process, which can use the XML parser, the envelope can be filled with headers and other appropriate information. After the headers, a pointer can be placed in the envelope and the MIME parser can stop parsing the message. The MIME parser can know to stop parsing when it hits attachments, for example.

The remainder of the message, which can include at least a portion of the body and any attachments, can then be written directly to persistent storage, either in small data "dumps" or on a data stream. Once the entire message is processed, such that the envelope and payload are created, an application can determine where the message portions reside using pointers in the message envelope. The envelope can be thought of as an "abstract" of the message. Once a user or application gets this abstract, that user or application can extract any portion of the message that is needed. For instance, if there are three attachments, the user or application can choose to extract one or two of the attachments from the persistent storage. When the user deletes the message, the envelope can be used, such as by an integration server or B2B server, to delete the associated portions in the persistent storage.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing access to a message in a computer environment, comprising:
   a computer, that includes
      a memory for in-memory storage of message information;
      a persistent store for persistent storage of message data; and
   an integration component that receives a message from a sending application, and then
      creates both an envelope, and a separate payload, for the message, including reading the message in incremental portions smaller than the total message size, and successively writing those portions to the persistent storage as the payload,
   stores the payload in the persistent store as a plurality of selectively retrievable portions,
   creates within the envelope a header information, and pointers to different portions of the payload,
   stores the envelope in the memory, while the separate payload is stored at the persistent store,
   provides in-memory access to the envelope by one or more receiving applications, and
   enables the receiving applications to access the envelope in memory, and to use the pointers in the message envelope to select and retrieve selected portions of the message payload from the persistent store for use by those receiving applications.

2. The system of claim 1, wherein the step of creating a separate envelope and payload includes parsing the message with a protocol parser to identify portions of the message to the integration component.

3. The system of claim 1, wherein the step of creating a separate envelope and payload includes parsing the message with an XML parser to read header and body portions of the message, and to separate the head and body portions into the envelope and payload respectively.

4. The system of claim 1, wherein the step of creating a separate envelope and payload includes processing the message in increments.

5. The system of claim 1 wherein the persistent store is located at the computer that receives the message.

6. The system of claim 1 wherein the persistent store is located at a computer different from the one that receives the message, and wherein the persistent store is shared among a plurality of computers for storage of and access to message payloads for the plurality of computers.

7. A method for providing access to a message in a computer environment, comprising the steps of:
   providing a computer that includes
      a memory for in-memory storage of message information,
      a persistent store for persistent storage of message data, and
      an integration component;
   receiving a message from a sending application, at the integration component at the computer;
   creating both an envelope, and a separate payload, for the message, including reading the message in incremental portions smaller than the total message size, and successively writing those portions to the persistent storage as the payload;
   storing the payload in the persistent store as a plurality of selectively retrievable portions;
   creating within the envelope a header information, and pointers to different portions of the payload;
   storing the envelope in the computer's memory, while the separate payload is stored at the persistent store; and
   providing in-memory access to the envelope by one or more receiving applications to access the envelope in memory, and to use the pointers in the message envelope to select and retrieve selected portions of the message payload, from the persistent store, for use by those receiving applications.

8. The method of claim 7, wherein the step of creating a separate envelope and payload includes parsing the message with a protocol parser to identify portions of the message to the integration component.

9. The method of claim 7, wherein the step of creating a separate envelope and payload includes parsing the message with an XML parser to read header and body portions of the message, and to separate the head and body portions into the envelope and payload respectively.

10. The method of claim 7, wherein the step of creating a separate envelope and payload includes processing the message in increments.

11. The method of claim 7 wherein the persistent store is located at the computer that receives the message.

12. The method of claim 7 wherein the persistent store is located at a computer different from the one that receives the message, and wherein the persistent store is shared among a plurality of computers for storage of and access to message payloads for the plurality of computers.

13. A computer readable medium including instructions stored thereon which when executed cause the computer to perform the steps of:
   receiving at a computer, including a memory for in-memory storage of message information, and a persistent store for persistent storage of message data, a message, from a sending application, at an integration component at the computer;
   creating both an envelope and a separate payload for the message, including reading the message in incremental portions smaller than the total message size, and successively writing those portions to the persistent storage as the payload;
   storing the payload in the persistent store as a plurality of selectively retrievable portions;
   creating within the envelope a header information, and pointers to different portions of the payload;
   storing the envelope in the computer's memory, while the separate Payload is stored at the persistent store; and
   providing in-memory access to the envelope, by one or more receiving applications to access the envelope in memory, and to use the pointers in the message envelope to selectively retrieve selected portions of the message payload from the persistent store, for use by those receiving applications.

14. The computer readable medium of claim 13, wherein the step of creating a separate envelope and payload includes parsing the message with a protocol parser to identify portions of the message to the integration component.

15. The computer readable medium of claim 13, wherein the step of creating a separate envelope and payload includes parsing the message with an XML parser to read header and body portions of the message, and to separate the head and body portions into the envelope and payload respectively.

16. The computer readable medium of claim 13, wherein the step of creating a separate envelope and payload includes processing the message in increments.

17. The computer readable medium of claim 13 wherein the persistent store is located at the computer that receives the message.

18. The computer readable medium of claim 13 wherein the persistent store is located at a computer different from the one that receives the message, and wherein the persistent store is shared among a plurality of computers for storage of and access to message payloads for the plurality of computers.

* * * * *

UNITED STATES PATENT AND TRADEMARK OFFICE
CERTIFICATE OF CORRECTION

| | | |
|---|---|---|
| PATENT NO. | : 7,840,532 B2 | Page 1 of 1 |
| APPLICATION NO. | : 11/740192 | |
| DATED | : November 23, 2010 | |
| INVENTOR(S) | : David Wiser et al. | |

It is certified that error appears in the above-identified patent and that said Letters Patent is hereby corrected as shown below:

On page 3, in column 1, under "Other Publications", line 26, delete "Self-configureable" and insert -- Self-configurable --, therefor.

In column 6, line 7, in claim 7, delete "payload," and insert -- payload --, therefor.

In column 6, line 48, in claim 13, delete "Payload" and insert -- payload --, therefor.

Signed and Sealed this
Second Day of August, 2011

David J. Kappos
*Director of the United States Patent and Trademark Office*